(12) United States Patent
Pattinson et al.

(10) Patent No.: US 11,879,350 B2
(45) Date of Patent: Jan. 23, 2024

(54) GAS PASSAGE (71) Applicant: ROLLS-ROYCE plc, London (GB)

(72) Inventors: Glen Pattinson, Derby (GB); Daniel P. Everington, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 17/938,804

(22) Filed: Oct. 7, 2022

(65) Prior Publication Data
US 2023/0128308 A1 Apr. 27, 2023

(30) Foreign Application Priority Data

Oct. 22, 2021 (GB) ...................................... 2115178

(51) Int. Cl.
F01D 25/26 (2006.01)
F01D 17/02 (2006.01)
F02C 7/00 (2006.01)

(52) U.S. Cl.
CPC ............. *F01D 25/26* (2013.01); *F01D 17/02* (2013.01); *F02C 7/00* (2013.01); *F05D 2220/32* (2013.01); *F05D 2240/14* (2013.01); *F05D 2260/80* (2013.01)

(58) Field of Classification Search
CPC ...... F01D 21/003; F01D 21/14; F01D 25/007; F01D 25/24; F01D 25/26; F04D 27/001; F04D 29/4206; F05D 2260/80; G01N 17/02; G01N 17/04; G01N 17/008; G01N 27/90; G01N 27/9093
See application file for complete search history.

(56) References Cited

U.S. PATENT DOCUMENTS

| 3,015,950 A * | 1/1962 | Doctor | F16D 66/027 324/71.2 |
| 4,406,580 A * | 9/1983 | Baran, Jr. | F01D 21/003 415/118 |
| 6,208,128 B1 * | 3/2001 | Braconnier | G01B 7/06 324/71.2 |
| 6,590,403 B1 * | 7/2003 | Gramer | H01C 3/08 324/71.2 |
| 7,392,713 B2 * | 7/2008 | Barkhoudarian | F01D 21/04 324/207.13 |
| 7,688,081 B2 * | 3/2010 | Webster | G01B 7/14 324/662 |

(Continued)

FOREIGN PATENT DOCUMENTS

GB 2466404 B 10/2010

OTHER PUBLICATIONS

Great Britain search report dated Mar. 29, 2022, issued in GB Patent Application No. 2115178.2.

(Continued)

*Primary Examiner* — Brian P Wolcott
(74) *Attorney, Agent, or Firm* — Shumaker & Sieffert, P.A.

(57) ABSTRACT

A gas passage for a gas turbine engine, which allows for quicker and easier determination of the condition of a liner within the gas passage without the need for dismantling the entire gas passage, or irreparably damaging large sections of the liner. The gas passage comprises a casing with one or more plugs which are at least partly coated in a material matching the material composition of the lining, which can be removed from the gas passage in order to analyse the condition of the lining material.

14 Claims, 6 Drawing Sheets (56) References Cited

U.S. PATENT DOCUMENTS

| | | | | |
|---|---|---|---|---|
| 9,476,689 B2* | 10/2016 | Steed | ................. | G01B 7/02 |
| 9,724,697 B2* | 8/2017 | Steed | ................. | B02C 17/22 |
| 9,915,518 B2* | 3/2018 | Leroux | ................. | G01B 7/08 |
| 10,156,155 B2* | 12/2018 | Gourdant | ................. | F04D 27/001 |
| 10,724,940 B2* | 7/2020 | Detor | ................. | G05B 23/0254 |
| 10,760,445 B2* | 9/2020 | Warren | ................. | F01D 21/003 |
| 11,262,290 B2* | 3/2022 | Mitsui | ................. | G01N 17/04 |
| 2010/0275574 A1* | 11/2010 | Salunkhe | ................. | F01D 21/003 |
| | | | | 60/39.091 |
| 2014/0356166 A1 | 12/2014 | Leroux | | |
| 2016/0084107 A1 | 3/2016 | Gourdant et al. | | |
| 2022/0196606 A1* | 6/2022 | Mochi | ................. | F04D 17/12 |

OTHER PUBLICATIONS

Extended Search Report from counterpart European Application No. 2115178.2 dated Mar. 22, 2023, 7 pp.

Response to Extended Search Report dated Mar. 22, 2023, from counterpart European Application No. 2115178.2 filed May 22, 2023, 32 pp.

\* cited by examiner

GAS PASSAGE

CROSS-REFERENCE TO RELATED APPLICATIONS

This specification is based upon and claims the benefit of priority from United Kingdom patent application GB 2115178.2 filed on Oct. 22, 2021, the entire contents of which is incorporated herein by reference.

BACKGROUND

Technical Field

The present disclosure relates to a gas passage for a gas turbine engine and a method for determining the integrity of a liner of a gas passage in a gas turbine engine.

Description of the Related Art

Optimal control of the flow of gas within a gas turbine engine is critical to maximising the performance of the engine. To that end, many parts of a gas turbine engine which have gases of one sort or another flowing through them may be lined with special materials to optimise the flow of the gas.

Like all materials, those in these gas passage liners can deteriorate over time. It is important to know what state the liner material is in in order to ensure optimal operation of the engine. However, these liners are often buried deep within the engine, and can be difficult to inspect without having open up the engine, and even open up the gas passage, potentially damaging or breaking the liner in the process. To that end, where possible, borescope ports are included within the engines, allowing a small camera to be inserted into the gas passages so that the liner can be assessed. However, the borescope only allows a visual inspection of the liner material, meaning that only surface indications can be used to determine the condition of the liner. Surface discolouration may be indicative of corrosion beneath the surface of the liner, or it may just be a stain, or a thin layer of material that is affected. Equally, the liner material may appear unblemished on the surface, but have started to corrode beneath the surface. Such corrosion, if left unchecked, could lead to chunks of the lining breaking off during use of the engine, potentially affecting the engine's performance.

It would therefore be advantageous to have a means of assessing the condition of a gas passage liner in such a way that corrosion above and below the surface of the liner material can be detected, without having to completely open up the gas passage and destroy the liner in the process.

SUMMARY

The present disclosure provides a gas passage, a gas turbine engine, and a method for determining the integrity of a liner of a gas passage in a gas turbine engine, as set out in the appended claims.

According to a first aspect there is provided a gas passage for a gas turbine engine, the gas passage comprising a casing, the casing comprising an exterior surface, an interior surface, and one or more apertures; a liner, the liner consisting of a material composition, and being attached to the interior surface of the casing so as to define a gas passage; and one or more plugs, the one or more plugs comprising a first section, the first section being insertable through an aperture of, and attachable to, the casing, and configured so as to be removable from the aperture via the exterior surface of the casing, and a second section, the second section being attached to the first section and dimensioned such that when the first section is attached to the casing, at least a first surface of the second section is in contact with the gas passage, wherein the second section consists of materials that match the material composition of the liner.

Such a gas passage provides a means for accurately determining the condition of both the surface and the bulk material beneath the surface of the liner within the gas passage without the need for dismantling the gas passage, or irreparably damaging large sections of the liner.

The gas passage may be configured such that the first section of the one or more plugs is configured to receive one or more sensors. These sensors can provide additional information about the conditions the liner has been experiencing since being installed within the gas passage.

The gas passage may be configured such that the first section of at least one of the one or more plugs comprises a hollow section into which the one or more sensors can be removably received. This configuration is useful if the sensors cannot be read out whilst in situ, or which are one-use in nature, and therefore need to be replaced periodically.

The gas passage may be configured such that the one or more sensors are imbedded within the first section of at least one of the one or more plugs. This arrangement is suitable for sensors which do not need periodic replacement, or which can be connected to and read out remotely.

The one or more sensors can be any of eddy current, humidity, or conductivity sensors. Such sensors are particularly useful for determining the presence of exposure conditions which can accelerate the rate at which a gas passage liner might degrade.

According to a second aspect there is provided a gas turbine engine comprising one or more gas passages of the first aspect. Such a gas turbine engine will benefit from having the gas passage described, as it will be easier and quicker to determine the condition of the liner within the one or more gas passages within the gas turbine engine.

According to a third aspect there is provided a method for determining the integrity of a liner of a gas passage in a gas turbine engine of the second aspect, the method comprising installing one or more plugs into the gas passage, then, at a later time, analysing the one or more plugs to determine the integrity of the second section, and extrapolating the condition of the liner of the gas passage from the results of the analysis of the one or more plugs.

Using such a method allows for accurately determining the condition of both the surface and the bulk material beneath the surface of the liner within the gas passage without the need for dismantling the gas passage, or irreparably damaging large sections of the liner.

The method can include analysing data from the one or more sensors in the first section of the plug, if such sensors have been included. Furthermore, the method can include performing step b) whilst the gas turbine engine is running, in the case where the plug includes sensors which can be read out remotely.

The method can include removing the one or more plugs from the gas passage between steps a) and b), so that the material on the plug which has been exposed to the working environment of the engine can be analysed to determine its condition.

The method can include analysing the one or more plugs by inspecting the second section for cracks. This can be done via eddy current or ultrasonic testing. Such inspection provides an accurate and reliable means for determining if the liner has cracks or fissures which may impede the performance of the liner.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

DESCRIPTION OF THE DRAWINGS

Embodiments will now be described by way of example only, with reference to the Figures, in which.

DETAILED DESCRIPTION

Figure 1:
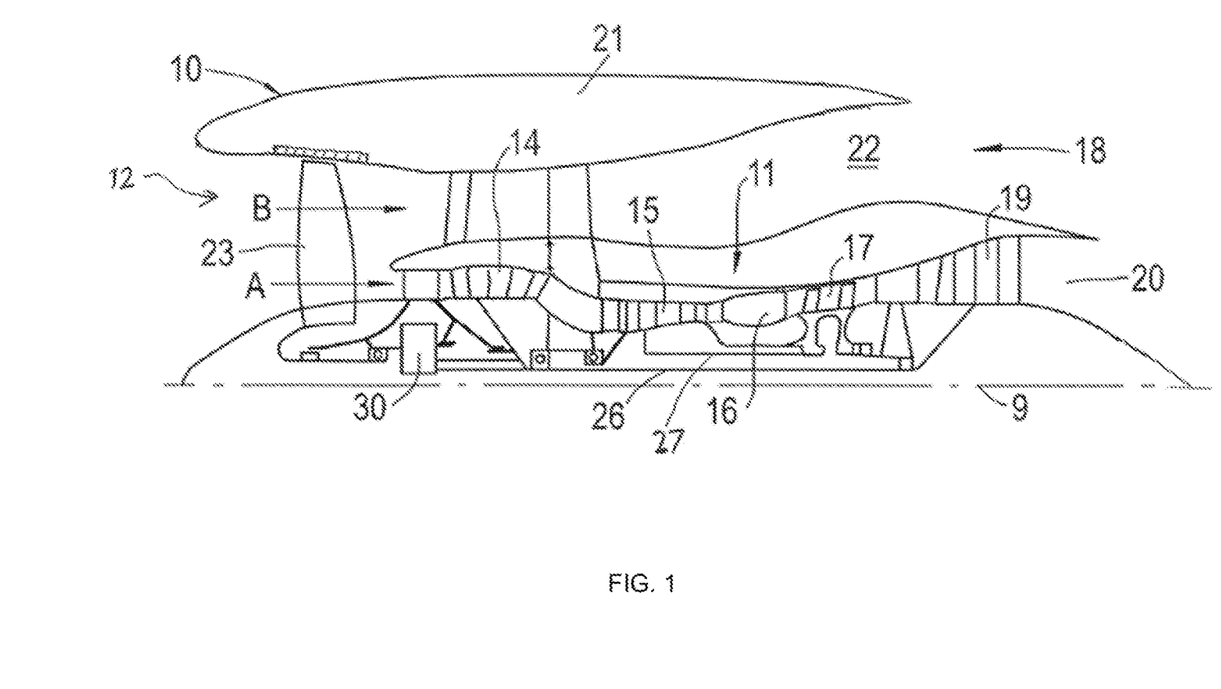
FIG. 1 is a sectional side view of a gas turbine engine.

FIG. 1 illustrates a gas turbine engine 10 of the type in which the gas passage of the present disclosure could be utilised. The gas turbine engine 10 has a principal rotational axis 9. The gas turbine engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 2:
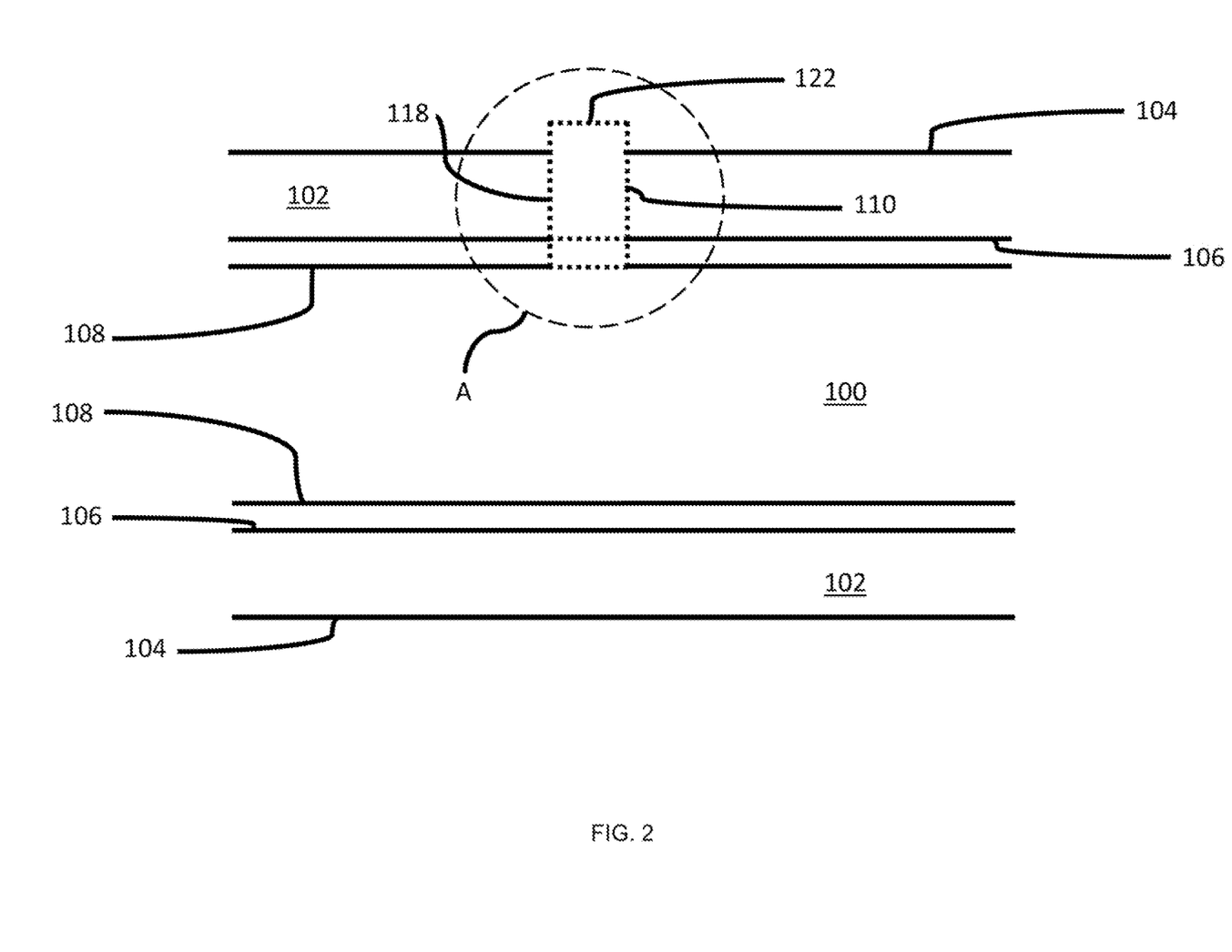
FIG. 2 is a sectional view of a gas passage according to a first aspect of the present disclosure.

FIG. 2 shows a sectional view of a gas passage 100 within the gas turbine engine 10. There are numerous gas passages within such a gas turbine engine: examples include, but are not limited to, compressors 14, 15, turbines 17, 19, the bypass duct 22, and the combustion equipment 16. Each of these parts of the engine have gas passing through them during the engine's operation, and as such can be considered as gas passages within the engine. It will be understood that the present disclosure provides a system and method that can be utilised with any gas passage within the engine that comprises a liner, the condition of which is important to the optimal functioning of the gas passage, and in turn the gas turbine engine 10.

The gas passage 100 is defined by a casing 102 which encompasses the gas passage. In FIG. 2, for ease of explanation, the gas passage 100 and casing 102 is shown as being a section of a straight cylinder, such as a pipe (with the top and bottom sections being joined by section of pipe outside of the plane of FIG. 2), but it will be understood by the skilled person that gas passages within the gas turbine engine 10 can take many and varied forms depending on the function of the passage within the engine, so long as the gas passage 100 defines a bounded region through which gas can pass. The casing 102 has an exterior surface 104 and an interior surface 106, the interior surface 106 being the surface of the gas passage which is closest to the gas contained within the gas passage.

The interior surface 106 has a liner 108 attached to it. The liner can serve different purposes, depending on where it is within the engine. In the example now described, the liner is an abradable lining of the sort that is often found in gas passages of gas turbine engines where rotating blades are positioned, and maintaining a minimal distance between the tips of the rotating blades and the edges of the gas passage is important. The skilled person will be familiar with such linings and their use in gas turbine engines, but will also appreciate this is not the only location within an engine where such an arrangement may be of use, as will be discussed later.

Also shown in FIG. 2 is a single plug 110, shown using dotted lines to differentiate it from the casing 102 and liner 108. The plug is dimensioned so as to fit through an aperture 118 in the casing 102 and the liner 108 leaving a minimal gap around it so as not to diminish the gas-tightness of the gas passage. The plug is configured so as to be insertable through and attachable to the casing, for example by having a shape corresponding to an aperture in the casing and liner.

The plug may have alignment features such as grooves or slots which can align with corresponding slots or grooves in the casing. Alternatively the plug may have a location feature at its base which can be aligned with a corresponding location feature on the casing. In yet another alternative, the plug may have a screw thread on its surface which cooperates with a screw thread on the interior of the aperture to allow the plug to be screwed into and unscrewed from the casing as required. The skilled person will appreciate there are numerous ways known in the art to ensure the correct location of the plug 110 within the casing 102. The plug 110 is configured so as to be removable via the exterior surface of the casing, for ease of access and retrieval. In FIG. 2 the base 122 of the plug 110 is shown protruding beyond the exterior surface 104 of the casing 102 for illustrative purposes, but the base of the plug can just as easily lie flush with, or be sunken compared to, the exterior surface 104 of the casing 102.

Figure 3:
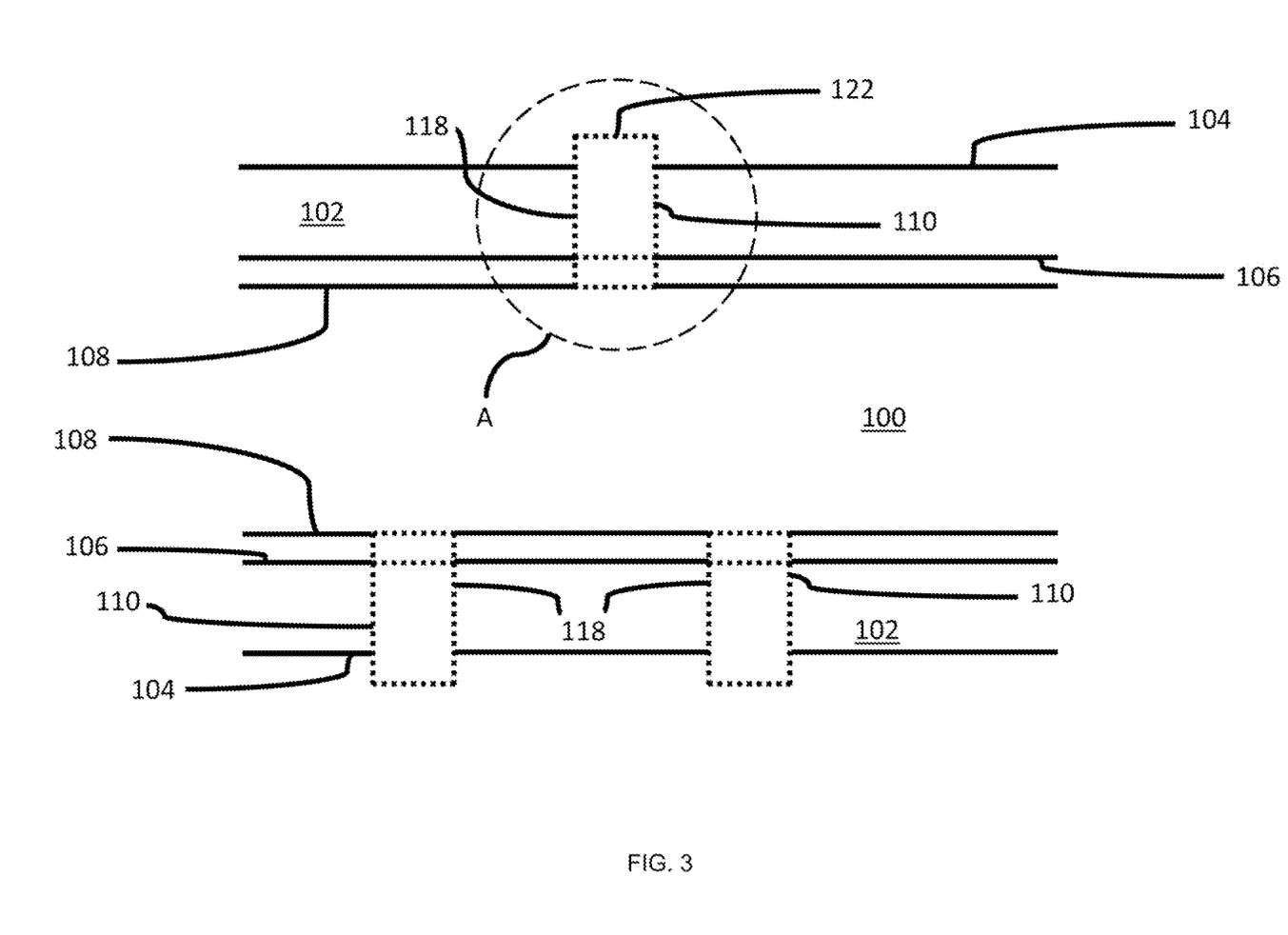
FIG. 3 is a sectional view of an alternative gas passage according to a first aspect of the present disclosure.

It will be understood that a gas passage 100 can comprise more than one aperture 118 suitable for the insertion of a plug 110. FIG. 3 shows schematically a gas passage 100 with multiple plugs 110 within the apertures 118 of the casing 102.

Figure 4:
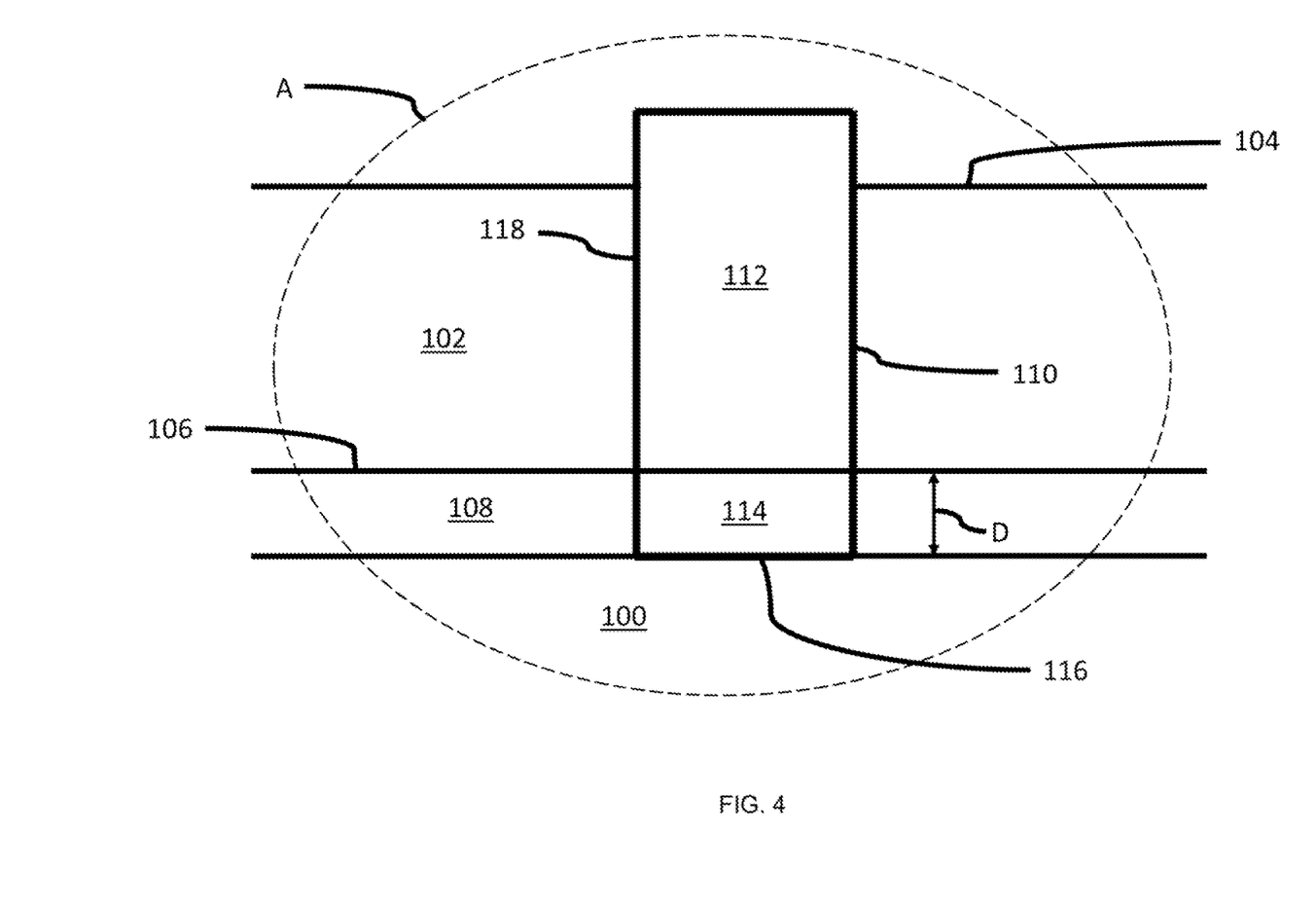
FIG. 4 is a close-up view of area A as indicated in FIG. 2.
Figure 5:
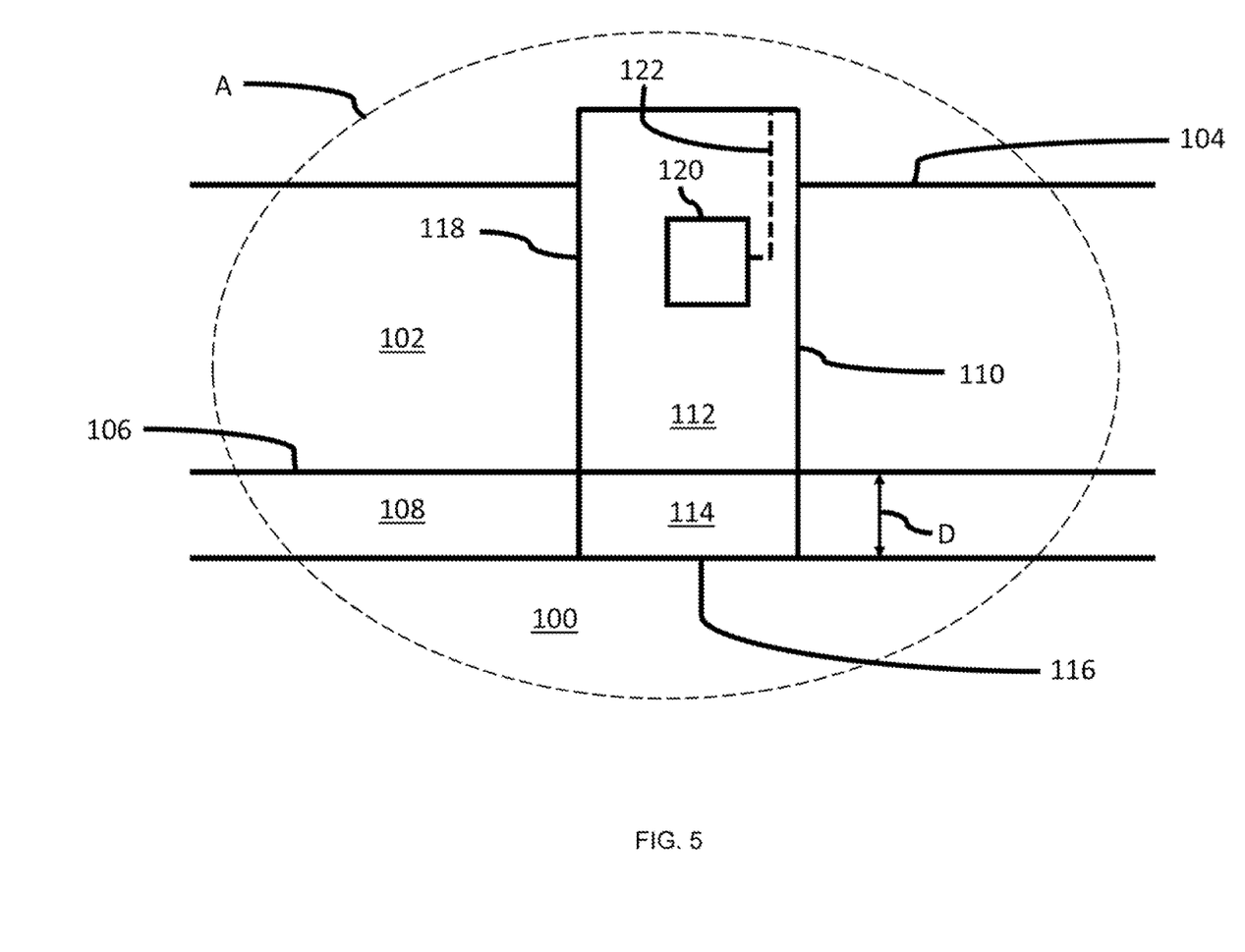
FIG. 5 is a close-up view of an alternative embodiment of area A as indicated in FIG. 2.

The circled region A of the gas passage 100 with the plug 110 is shown in greater detail in FIG. 4. The plug 110 comprises two sections: a first section 112 which is designed so as to be positioned within and affixed to the casing 102, and a second section 114 which is attached to the first section 112 and aligned with the liner 108 of the casing 102. The casing 102 can comprise one or more apertures into which plugs 110 can be inserted and later removed, although only one is shown in FIGS. 4 and 5 for clarity. The primary function of the first section 112 of the plug 110 is to provide a means for removably affixing the plug to the casing 102 in such a way that when the plug is in position within the aperture of the casing, the second section 114 of the plug is aligned with the liner 108 which is attached to the interior surface of the casing.

It will be appreciated by the skilled person that the material(s) used to construct the first section needs to be chosen so as to provide acceptable performance for the environment it is placed in, which may mean materials with the same or similar properties to those used for the surrounding casing are likely to be used. The material chosen must be such that the plug can be inserted and removed through the aperture 118, and when in position within the casing 102, the plug will not adversely affect the performance of the casing 102, liner 108, or gas passage 100. The skilled person will be familiar with the types of material that can be used in different locations within a gas turbine engine, and so for the purposes of this disclosure, no more discussion of the nature of the materials used for the construction of the first section 112 of the one or more plugs will be provided.

The second section 114 of the plug 110 is dimensioned so as to act as a part of the liner 108 when the plug 110 is installed within the casing 102. In FIGS. 2, 3, and 4 the second section is shown as having a first surface 116 flush with the interior surface of the liner 108, and a depth D equal to the depth of the liner. This dimensional equivalence is not essential for the working of the system, but the skilled person will appreciate it is likely preferable, as, at least in the context of a gas turbine engine, the flow of gas through a gas passage is highly controlled, and the introduction of turbulence which can be caused by gaps or protrusions in the walls of a gas passage is to be minimised wherever possible. It is however essential that at least the first surface of the second section is in contact with the gas passage, such that there is at least one surface (herein called the first surface 116) of the second section which is in contact with the same environmental conditions as the surrounding liner 108.

The second section 114 of the plug consists of the same materials as the surrounding liner. This is important, because the second section of the plug will be analysed for signs of corrosion, and the results of that analysis must be relatable to the rest of the liner installed within the gas passage. As stated previously, surface discolouration of the liner may be indicative of corrosion beneath the surface of the liner, or it may just be a stain, or a thin layer of material that is affected. Equally, the liner material may appear unblemished on the surface, but have started to corrode beneath the surface. Such corrosion, if left unchecked, could lead to chunks of the lining breaking off during use of the engine, potentially affecting the engine's performance. Having the second section of the plug consist of materials that match the material composition of the liner, which is to say the second section is made of the same material, or the same materials in the same proportions as that of the liner, allows the second section of the plug to act as the best possible surrogate for the gas passage liner. As a result, assessment of the condition of the second section of the plug for indications of corrosion above and/or below the surface of the second section gives the best possible indication of the condition of the liner material in the gas passage. This is in contrast to prior art devices and methods which have had to determine the condition of the liner based on surface indications only. If the materials used in the second section 114 of the plug 110 differ from the materials used in the liner 108, there will be uncertainty with respect to what the testing of the second section of the plug means for the condition of the surrounding liner.

Typically, an abradable liner such as that used in the region of a rotor might consist of an aluminium-silicon alloy, which has the necessary physical properties for the part of the engine it is being used in. To use this as an example, where the liner 108 consists of an aluminium-silicon alloy, then second section 114 of the plug 110 will also consist of the same aluminium-silicon alloy, i.e. having the same make-up and material properties, e.g. percentages of aluminium and silicon. It will be understood that other gas passages and liners can benefit from this arrangement. For example, the disclosure could equally apply to a component of the combustion equipment which is provided with a special heat-resistant liner, or a component of the engine bypass with a special friction-reducing liner. In such cases, the second section 114 of the plug 110 will also consist of the same material(s) used in those liners. The material(s) used to construct the second section will be different to those used to construct the first section, as the requirements of the first section, such as structural support and rigidity, are very different to those of the second section, which is mimicking the liner, and as such would be unsuitable for use in the first section which effectively becomes part of the casing.

In order to fulfil the purpose of the plug and casing design, after the one or more plugs have been inserted into the casing 102 so as to fill the apertures 118 in the casing, the engine can be subjected to a range of scenarios. For example, the engine may be used on an aeroplane for a period of time, or put through test conditions in a laboratory, or even just left idle or in storage for a period of time. Any and all of these situations can lead to deterioration of the liners within a gas turbine engine, and so it is advantageous to be able to inspect the condition of the liner 108, even if the engine has not been operated since its last inspection.

When it is desired to know the condition of the liner 108, such as before the engine is to be operated on an aeroplane, the one or more plugs 110 can be removed from the casing 102 and the second section 114 can be tested via any useful means for determining the condition of the liner material as represented by the second section 114. One feature indicative of corrosion is the presence of microscopic or larger cracks within the liner. Whilst optical inspection, such as that known in the prior art, can be useful for determining if cracks are present on the surface of the liner 108, the second section 114 of the plug 110 could be subjected to any or all of X-ray, CT, Eddy current or ultrasonic evaluations as a means of determining the condition of the liner material, and in particular as a way of determining if corrosion or cracking might be present below the visible surface of the second section. The testing of the second section can be destructive or non-destructive, as the second section 114 of the plug 110 can be replaced or repaired before re-insertion into the engine 10 prior to operation. If it is found that the second section does contain an unacceptable degree of corrosion or cracking, this is a good indication that the liner inside the gas passage will need replacing or repairing before the engine is next operated.

The locations of the one or more apertures 118 within the casing 102 can be chosen in order to obtain the most useful information from the one or more plugs 110. For example, with regards to concerns about the effect of humidity on the liner 108, it may be advisable to have at least one plug positioned in the region of the lowest part of the gas passage, where any liquid, for example condensation, is likely to pool. If a plug from such a location in a gas passage shows no sign of degradation, it is unlikely that the liner in other, drier regions of the gas passage will be in a worse condition, and so therefore it is likely the gas passage is in a good state of repair.

By providing the ability to comprehensively test a representative section of the liner, a far better evaluation of the condition of the liner can be achieved than with a purely optical inspection, and without the need to remove or destroy the entire liner in the process. Crucially, the condition of the body of the liner, i.e. that part of the liner below the visible surface, can be estimated by the surrogate that is the second section 114 of the plug 110, which will have experienced the same conditions as the body of the liner, and, by virtue of consisting of the same material(s), will provide the most accurate indication of the state of the liner, without the need for completely opening up the gas passage in order to access the liner for inspection, or removing the liner from the casing to see how the liner looks under the surface.

Figure 6:
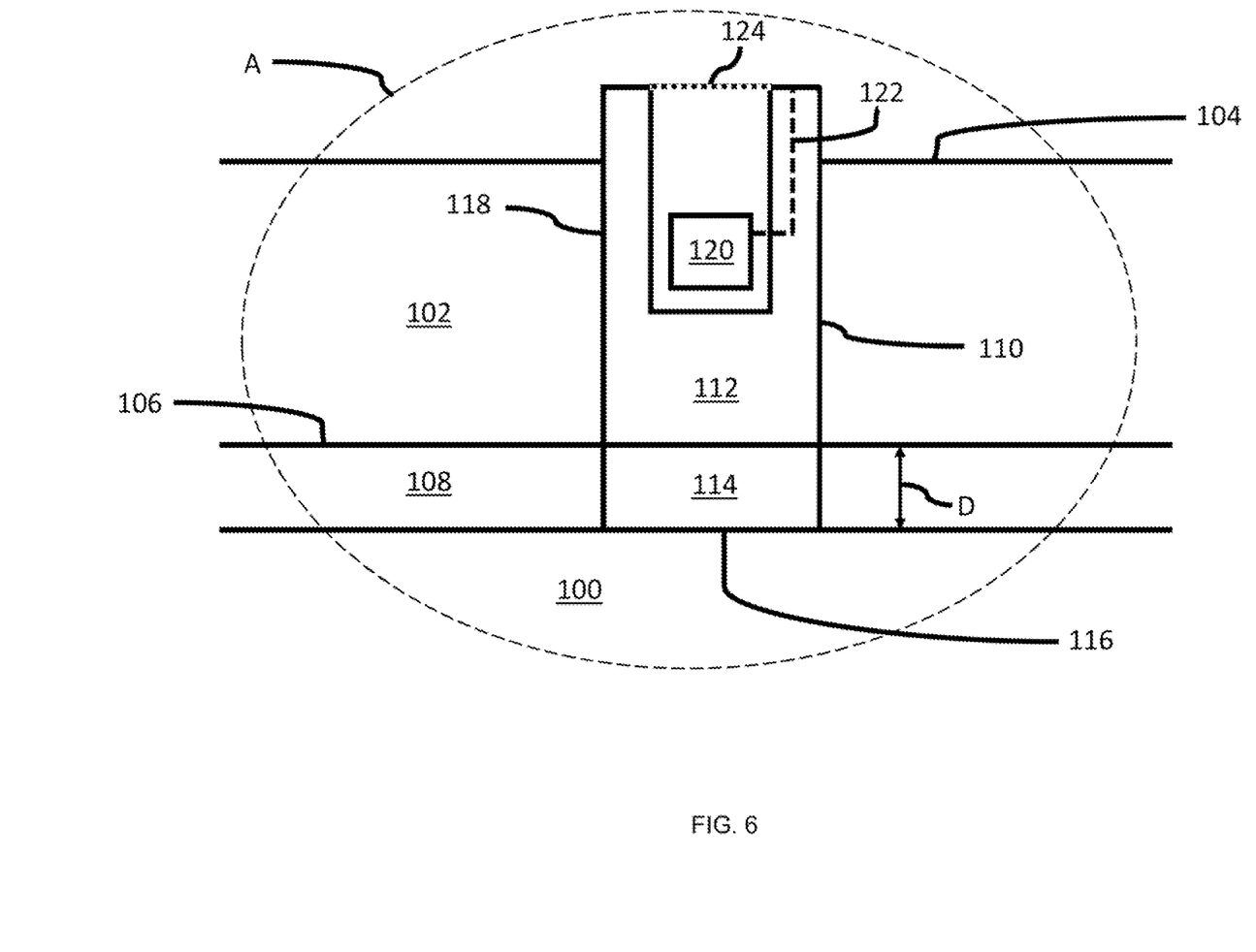
FIG. 6 is a close-up view of a further alternative embodiment of area A as indicated in FIG. 2.

In addition to testing the second section 114 to determine the condition of the liner 108, the first section 112 of the plug 110 can be configured to receive one or more sensors 120 which can be used to provide data relating to the either the condition of the second section 114 of the plug 110, or the conditions the second section of the plug has been exposed to. FIGS. 5 and 6 show schematics of alternative arrangements incorporating this feature. For example, eddy current sensors or simple temperature/humidity/conductivity sensors could be used to give an indication of engine storage conditions, and thus the risk of liner corrosion occurring. When the engine is in operation, these sensors could be read out in real time, providing useful information on the condition of the gas passage 100 liner 108 in-flight.

As shown in FIG. 5, the one or more sensors 120 can be embedded within the first section 112 of the plug 110, or, as shown in FIG. 6, the one or more sensors 120 can be received by a hollow section 124 or cavity within the first section configured such that the one or more sensors can be inserted into and removed from the first section without needing to remove the plug 110 from the casing 102. Depending on the type of sensors and their use, it may be convenient to remove them from the plug for analysis, and so having a hollow section or cavity within the first section of the plug enables this. The sensors 120 do not extend into the second section 114 of the plug 110, as the sensors are made from different material(s) to the second section. Introducing materials that are different to those used in the liner could adversely affect the ability of the second section to act as a surrogate for the liner installed in neighbouring areas within the gas passage, and so this should be avoided.

When using plugs 110 such as that shown in FIG. 4 with one or more sensors 120 located in the first section 112, the analysis process can include looking at both the first 112 and second 114 sections of the plug 110. The sensors 120 in the first section 112 of the plug can be used to determine information with regards to the conditions the plug has been experiencing, and the second section 114 can be analysed to determine the level of corrosion that has occurred, if any.

Alternatively, in embodiments where the plug 110 includes one or more sensors 120 within its first section, the data from these sensors can be analysed without having to remove the plug from the casing. Connection to the sensors 120 can be by a wired connection 122, or can be wireless, both types of connection being known in the art. By looking at data relating to, for example, the range and duration of temperatures and/or humidities that the casing has experienced, the condition of the liner can be estimated based on the known behaviour of its constituent material(s) under those conditions. In these embodiments, it may be possible to acquire data whilst the engine is running. For example, the engine could be run on a test bed facility (i.e. not attached to an aeroplane wing), and the sensors could be connected via wired or wireless connection to a computer for data retrieval and analysis. Alternatively, the engine could be run on-wing with the sensors connected wirelessly to a computer onboard the plane, or relayed from the plane to a ground station for the sensor data to be processed and analysed.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A gas passage for a gas turbine engine, the gas passage comprising:
   a casing, the casing comprising an exterior surface, an interior surface, and one or more apertures;
   a liner, the liner consisting of a material composition, and being attached to the interior surface of the casing so as to define the gas passage; and
   one or more plugs provided in the one or more apertures of the casing, the one or more plugs comprising:
   a first section, the first section being inserted through an aperture of, and attached to, the casing, and configured so as to be removable from the aperture via the exterior surface of the casing, wherein the first section defining a first axial width; and
   a second section attached to the first section, the second section defining a second axial width, and the second section dimensioned such that when the first section is attached to the casing, at least a first surface of the second section is in contact with environmental conditions of the liner;

wherein the second section consists of materials that match the material composition of the liner, wherein the first axial width is equal to the second axial width.

2. The gas passage of claim 1, wherein the first section of the one or more plugs is configured to receive one or more sensors.

3. The gas passage of claim 2, wherein the first section of at least one of the one or more plugs comprises a hollow section into which the one or more sensors can be removably received.

4. The gas passage of claim 2, wherein the one or more sensors are imbedded within the first section of at least one of the one or more plugs.

5. The gas passage of claim 2, wherein the one or more sensors comprise any of eddy current, humidity, or conductivity sensors.

6. A gas turbine engine including one or more gas passages of claim 1.

7. A method for determining the integrity of a liner of a gas passage in a gas turbine engine of claim 6, the method comprising:

a) installing one or more plugs into the gas passage;
b) at a later time, analysing the one or more plugs to determine the integrity of the second section; and
c) extrapolating a bulk condition of the liner of the gas passage from the results of the analysis of the one or more plugs.

8. The method of claim 7, wherein the first section of the one or more plugs is configured to receive one or more sensors and the method comprises analysing data from the one or more sensors in the first section of the one or more plugs.

9. The method of claim 8, wherein the method comprises performing step b) whilst the gas turbine engine is running.

10. The method of claim 7, wherein the method comprises removing the one or more plugs from the gas passage between steps a) and b).

11. The method of claim 10, wherein analysing the one or more plugs comprises inspecting the second section for cracks.

12. The method of claim 11, wherein inspecting the second section for cracks comprises eddy current or ultrasonic testing.

13. The gas passage of claim 1, wherein the first surface of the second section lies flush with an interior surface of the liner.

14. The gas passage of claim 1, wherein the second section has a depth equal to the depth of the liner.

* * * * *